(12) United States Patent
Jin et al.

(10) Patent No.: US 10,733,758 B2
(45) Date of Patent: Aug. 4, 2020

(54) LEARNING-BASED GROUND POSITION ESTIMATION

(71) Applicant: RAPSODO PTE. LTD., Singapore (SG)

(72) Inventors: Xu Jin, Yew Tee Residences (SG); Xi Tao, Pine Grove (SG); Boyi Zhang, Singapore (SG); Batuhan Okur, Singapore (SG)

(73) Assignee: RAPSODO PTE. LTD., Singapore (SG)

( * ) Notice: Subject to any disclaimer, the term of this patent is extended or adjusted under 35 U.S.C. 154(b) by 137 days.

(21) Appl. No.: 16/175,749

(22) Filed: Oct. 30, 2018

(65) Prior Publication Data

US 2020/0134863 A1 Apr. 30, 2020

(51) Int. Cl.
*G06T 7/73* (2017.01)
*G06T 7/246* (2017.01)

(52) U.S. Cl.
CPC .............. *G06T 7/74* (2017.01); *G06T 7/248* (2017.01); *G06T 2200/24* (2013.01); *G06T 2207/20084* (2013.01); *G06T 2207/30224* (2013.01); *G06T 2207/30241* (2013.01)

(58) Field of Classification Search
CPC ........... G06T 7/20; G06T 7/246; G06T 7/248; G06T 7/251; G06T 7/70; G06T 7/73; G06T 7/74; G06T 7/75; G06T 7/97; G06T 2207/30224; G06T 2207/30241; G06K 9/00711; G06K 9/00724
See application file for complete search history.

(56) References Cited

U.S. PATENT DOCUMENTS

2013/0095961 A1 4/2013 Marty et al.
2014/0301601 A1* 10/2014 Marty et al. .............. G06T 7/80
382/103
2019/0164295 A1* 5/2019 Kim et al. ......... G06K 9/00335

OTHER PUBLICATIONS

Chen, Hua-Tsung, et al., Physics-based ball tracking and 3D trajectory reconstruction with applications to shooting location estimation in basketball video. Journal of Visual Communication and Image Representation, vol. 20, Issue 3, Apr. 2009, pp. 204-216. 13 pgs.

* cited by examiner

*Primary Examiner* — Andrew W Johns
(74) *Attorney, Agent, or Firm* — Maschoff Brennan

(57) ABSTRACT

Operations of the present disclosure may include receiving a group of images taken by a camera over time in an environment. The operations may also include identifying a first position of an object in a target region of the environment in a first image of the group of images and identifying a second position of the object in a second image of the group of images. Additionally, the operations may include determining an estimated trajectory of the object based on the first position of the object and the second position of the object. The operations may further include, based on the estimated trajectory, estimating a ground position in the environment associated with a starting point of the estimated trajectory of the object. Additionally, the operations may include providing the ground position associated with the starting point of the estimated trajectory of the object for display in a graphical user interface.

20 Claims, 6 Drawing Sheets

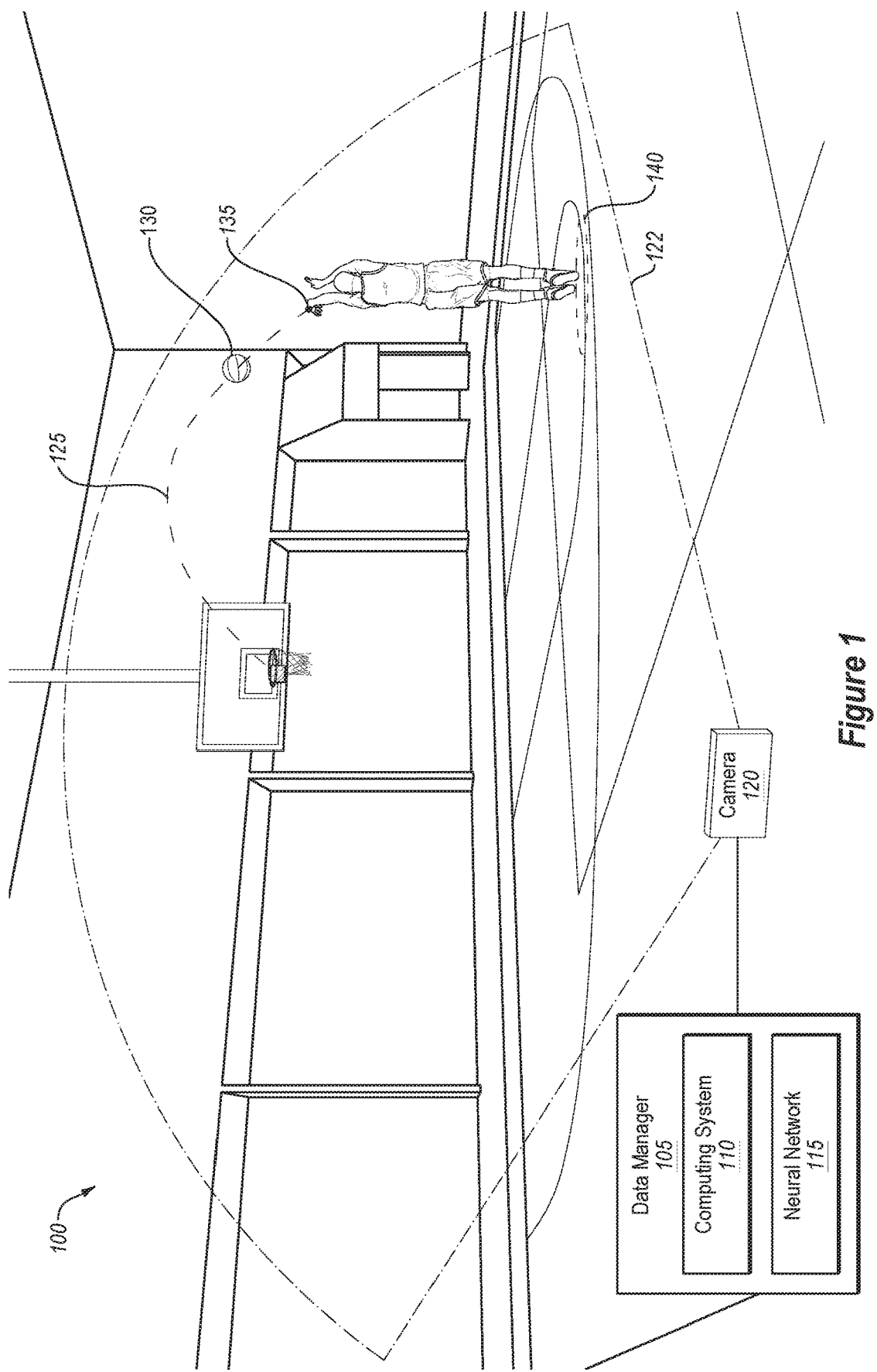

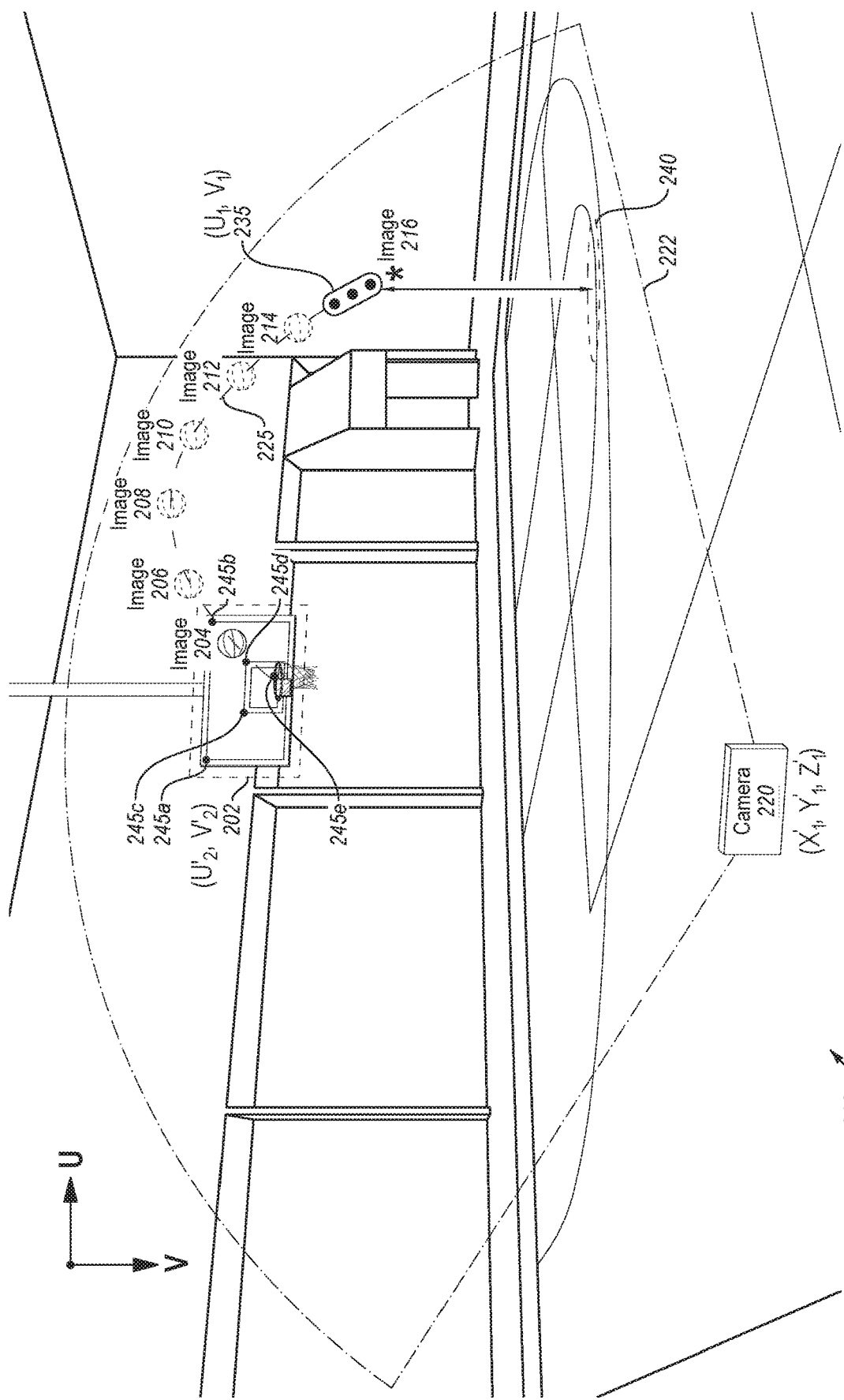

LEARNING-BASED GROUND POSITION ESTIMATION

FIELD

The application relates generally to learning-based ground position estimation.

BACKGROUND

Objects sometimes may travel through the air. It may be difficult to determine a location where the ball was released, particularly in situations where the location of the release of the ball is obstructed from view. Some computer systems may attempt to determine a location of the ball release but are widely inaccurate even in the simplest scenarios.

The subject matter claimed herein is not limited to embodiments that solve any disadvantages or that operate only in environments such as those described above. Rather, this background is only provided to illustrate one example technology area where some embodiments described herein may be practiced.

SUMMARY

Embodiments of the disclosure discuss various operations performed in a method, system, and/or computer-readable medium. The operations may include receiving a group of images taken by a camera over time in an environment. The operations may also include identifying a first position of an object in a target region of the environment in a first image of the group of images and identifying a second position of the object in a second image of the group of images. Additionally, the operations may include determining an estimated trajectory of the object based on the first position of the object and the second position of the object. The operations may further include, based on the estimated trajectory, estimating a ground position in the environment associated with a starting point of the estimated trajectory of the object. Additionally, the operations may include providing the ground position associated with the starting point of the estimated trajectory of the object for display in a graphical user interface.

BRIEF DESCRIPTION OF THE DRAWINGS

Example embodiments will be described and explained with additional specificity and detail through the use of the accompanying drawings in which:

FIG. 1 illustrates an example environment to estimate a ground position;

FIG. 2B illustrates another example embodiment in which the ground position of FIG. 1 is estimated;

DESCRIPTION OF EMBODIMENTS

Figure 2A:
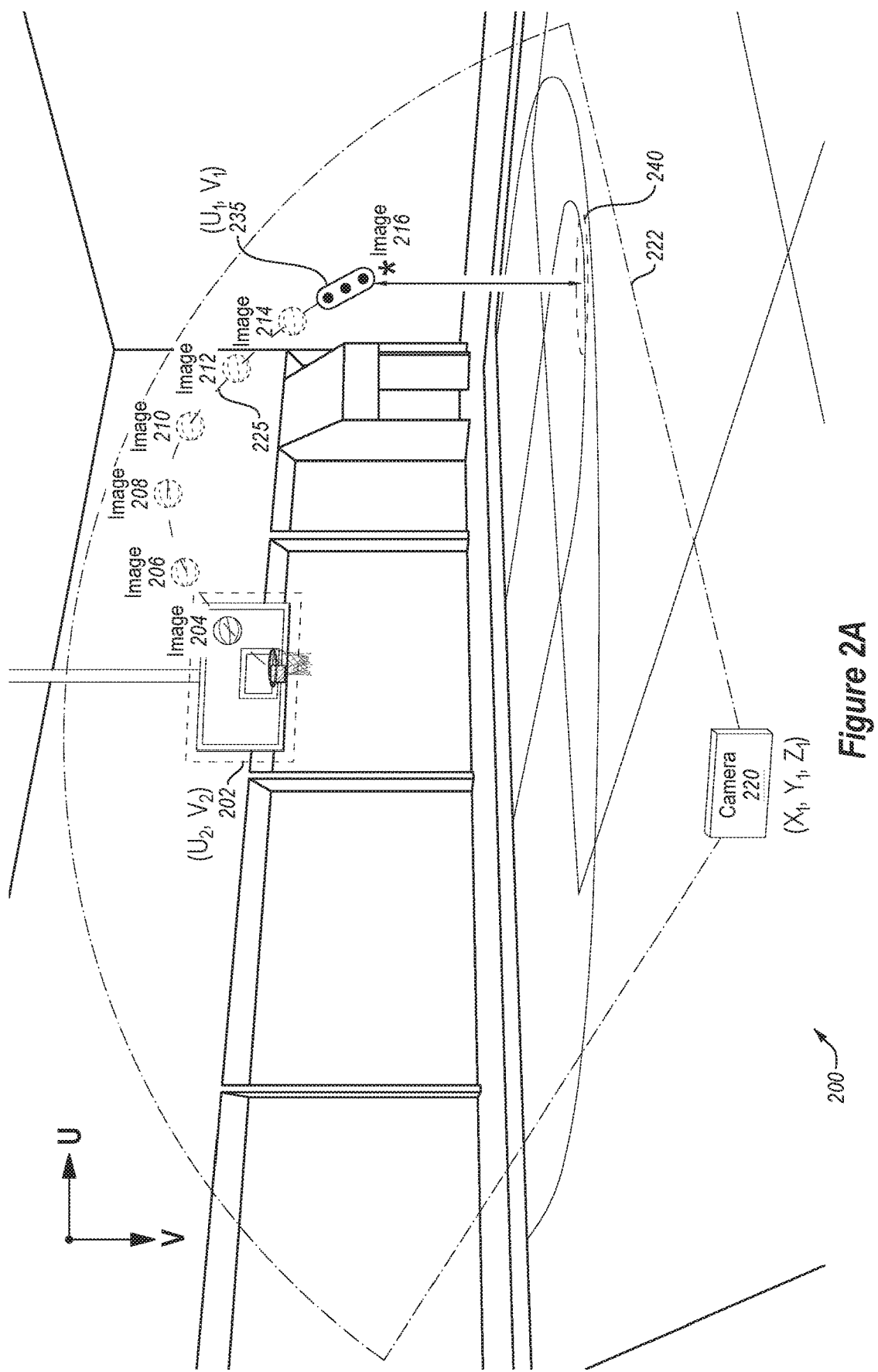
FIG. 2A illustrates an example embodiment in which the ground position of FIG. 1 is estimated.

Many technologies and fields may benefit from imaging analysis. For example, in sports, players may improve performance by reviewing certain aspects of their performance, such as a particular part of a backswing in a golf stroke, a follow-through on a tennis forehand, a first placement during a jab-cross combination in boxing, a free-throw arch in basketball, a spike angle in volleyball, etc. The imaging analysis may help the player to identify areas of strength, weakness, poor form, etc.

The imaging analysis may be used to identify a shooting position of an object. The shooting position may be referred to as a spatial location where the object was released into the air. In at least one embodiment, the shooting position may refer to a spatial location on a surface or plane at the time that the object was released into the air. In sports, the shooting position, for example, may refer to a position on a playing field, such as a point on a basketball court where a player was when the player released the ball (such as in a shot on a goal, or in a pass to another player). Alternatively, the shooting position may refer to a spatial location of the object at the moment the object was released into the air. For example, in sports, the shooting location may refer to a location of a ball when it is released to the air.

In some sports such as basketball or netball, shooting position is often related to performance metrics (e.g., game statistics) such as field goal percentage, free throw percentage, three-point percentage, points in the paint, etc. The shooting position can also be related to personal development and not necessarily related to a game statistic (e.g., my left corner three-point shot is not as consistent as my right corner three-point shot). The shooting position is thus related to many aspects of basketball and netball. Accordingly, the shooting position receives much time and attention with respect to imaging analysis.

In some conventional methods and systems, identifying the shooting position can be a difficult task and/or computationally intense. For example, some conventional methods and systems may endeavor to identify a shooting position using trajectory analysis. However, these conventional methods and systems may use calibration processes and/or fixed imaging parameters to identify or fixedly maintain a position of a camera used in the imaging analysis. For example, some existing systems may detect the player who does the shooting, such as by tracing back the ball's trajectory and performing a person detection in a nearby region. This approach typically involves drawing a bounding box of the player in the image. Then, the center of the bottom side of the bounding box is downward projected onto the court using an estimated projection from the image plane to the ground plane.

Problems with these conventional systems may include: 1) the view of the shooter might be blocked by another player, which results in an incorrect identification of the shooter, and thus the wrong shooting position; 2) the bounding box of the shooter might be inaccurate, e.g. the player's feet may be outside the bounding box; 3) these systems typically assume that the shooter's feet are on the ground when they shoot the ball; and 4) a calibration process is often needed to estimate the projection from image plane to the court coordinate system (the ground plane). Myriad other drawbacks with conventional systems exist.

Aspects of the present disclosure address these and other problems with conventional methods and systems by providing a new, computer-based approach that improves accuracy of the shooting position estimation while also allowing for system flexibility (e.g., use in a client device). Further, the disclosed systems and methods provide significant improvements over conventional systems through reduced computational requirements to achieve vastly superior results, as compared to conventional systems. For example, according to an example embodiment of the present disclosure, a learning-based system may be implemented such that having precise positional coordinates of a camera are unnecessary. Additionally or alternatively, in an example embodiment of the present disclosure, computational cycles that would be required under conventional systems for player detection is not required or implemented by the present disclosure.

Further, according to one or more embodiments of the present disclosure, movement of the camera and/or a target region (such as a backboard region) may not affect the accuracy of determining the shooting position as may be the case in conventional methods and systems. For example, movement of the camera and/or the target region may be compensated for according to a method of the present disclosure that includes finding the target region, as described in further detail below.

Moreover, according to one or more embodiments of the present disclosure, variation in a starting point of the trajectory of the object (e.g., due to different player heights and/or different types of shots such as a jump shot or free throw) may not affect the accuracy of determining the shooting position as may be the case in conventional methods and systems. For example, a flight time of the object may be determined to compensate for variation in the starting point of the trajectory of the object, as described in further detail below.

FIG. 1 illustrates an example environment to estimate a ground position. The environment 100 is arranged in accordance with at least one embodiment of the present disclosure. As illustrated, the environment 100 may include a data manager 105 having a computing system 110 and a neural network 115, a camera 120 having a field of view 122, a trajectory 125, an object 130, a starting point 135, and a ground position 140.

In some embodiments, the data manager 105 may direct operations of the computing system 110 and/or the neural network 115. Additionally or alternatively, the data manager 105 may facilitate communication between the system 110 and the neural network 115. Additionally or alternatively, the data manager 105 may facilitate communication between the camera 120 and any of the computing system 110 and the neural network 115.

In some embodiments, the data manager 105 may be part of a client device. Some examples of the client device may include a mobile phone, a smartphone, a tablet computer, a laptop computer, a desktop computer, a set-top box, a virtual-reality device, a wearable device, or a connected device, etc.

Figure 4:
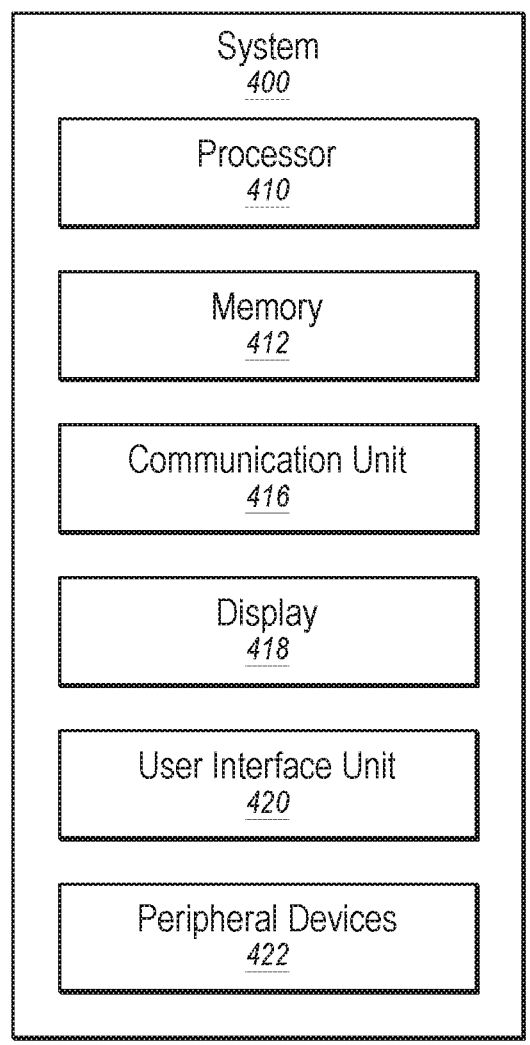
FIG. 4 illustrates a block diagram of an example computing system.

In some embodiments, the computing system 110 may include any computer system, such as the system 400 described in conjunction with FIG. 4. In these or other embodiments, the neural network 115 may include any learning-based mechanism. Examples of neural networks may include: perceptron, multilayer peceptron, feed forward, radial basis network, deep feed forward, recurrent neural network, long/short term memory, gated recurrent unit, auto encoder, variational auto encoder, denoising auto encoder, sparse auto encoder, any sequence-to-sequence model, shallow neural networks, markov chain, hopfield network, boltzmann machine, restricted boltzmann machine, deep belief network, deep convolutional network, convolutional neural network (e.g., VGG-16), deconvolutional network, deep convolutional inverse graphics network, modular neural network, generative adversarial network, liquid state machine, extreme learning machine, echo state network, recursive neural network, deep residual network, kohonen network, support vector machine, neural turing machine, etc.

The neural network 115 may receive data from the camera 120. The camera 120 may be included as part of the client device or may be a device separate from the client device. In some embodiments, the field of view 122 may be a three-dimensional space in which the camera 120 may image (e.g., in video mode or picture mode). The camera 120 may be positioned such that the field of view 122 includes the starting point 135 of the trajectory 125, a target region (e.g., the target region 202 of FIGS. 2A, 2B, and 2C), and at least a substantial portion between the starting point 135 and the target region.

The neural network 115 may use the data generated by the camera 120 to learn during a training process (e.g., to populate one or more layers or neurons in the neural network 115). Additionally or alternatively, the neural network 115 may use the data generated by the camera 120 to learn post-training (e.g., to re-populate one or more layers or neurons in the neural network 115 or to populate layers or neurons in response to changed circumstances in the environment 100).

For example, using data generated by the camera 120, the neural network 115 may learn what the starting point 135 of the trajectory 125 may be for a given player (e.g., after several, tens, or hundreds of training shots). As referred to in the present disclosure, the starting point 135 may include a position of the object 130 at which there is detected a beginning of motion of the object 130 approximately along the trajectory 125. For example, the starting point 135 may include a position at which the object 130 is detected as having left the hands of a player at a moment when the object 130 is released into air. Additionally or alternatively, the starting point 135 may include a position at which the object 130 is detected as being within the hands of the player at a moment when the object 130 is in-process of being released into air (e.g., a moment when a force is being exerted against the object 130 to impart motion of the object 130 in a direction approximately along the trajectory 125). Additionally or alternatively, the starting point 135 may include a position at which the object 130 is detected as being within the hands of the player at a moment when the object 130 is about to begin the process of being released into air (e.g., a moment when the object 130 is approximately stationary prior to having a force exerted upon the object 130 in the direction approximately along the trajectory 125). Thus, in some embodiments, the starting point 135 of the trajectory 125 may include the position of the object 130 at some point prior to, during, or after the object 130 is shot along the trajectory 125.

Training the neural network 115 to learn the starting point 135 may include receiving data generated by the camera 120 in which the data corresponds to different shots taken by the player. Examples of different shots taken by the player may include shots taken at different locations such as at different ground positions 140 in the environment 100. Additionally or alternatively, different shots taken by the player may include different types of shots such as standing shots, jump shots, fade away shots, floater shots, etc. As the neural network 115 receives more and more data corresponding to the different shots taken by the player, the neural network 115 may increase in accuracy with respect to the starting point 135 as determined. Additionally or alternatively, the neural network 115 may learn a range of starting points 135 that are specific to the player (e.g., specific to the height, type of shots, jumping ability, form of release, etc. of the player). Other examples including the neural network 115 are described with additional specificity in conjunction with FIGS. 2A, 2B, and 2C.

In some embodiments, the trajectory 125 may include a path of travel of the object 130. In these or other embodiments, the camera 120 may generate data that depicts the object 130 at various positions. Based on the generated data from the camera 120 depicting the object 130 at various positions, the data manager 105 may determine the trajectory 125 of the object 130. Determining the trajectory 125 of the object 130 is discussed in greater detail in conjunction with FIGS. 2A, 2B, and 2C.

In some embodiments, the object 130 may include any projectile (e.g., any projectile not substantially influenced by a Magnus force). Thus, in some embodiments, the object 130 may include any object that may be suitable for any slow speed object sports. In these or other embodiments, the object 130 may include, for example, a basketball, a netball, a soccer ball, a football, a rugby ball, a ping-pong ball, a kickball, a volleyball, a dodgeball, a cricket ball, a shuttlecock, a tennis ball, a baseball, etc. Accordingly, the scope of the present disclosure may include a wide variety of sports and activities in which it may be desirable to determine the ground position 140 based on the trajectory 125 of the object 130. Although some of the figures and corresponding description may be associated with one or more example sports or activities, the scope of the present disclosure is not limited to those example sports or activities given the variety of applications herein contemplated.

In some embodiments, the ground position 140 may correspond to a location of the player on the ground (e.g., a court, a field, a playing surface, etc.) at about the time the object 130 is positioned at the starting point 135 of the trajectory 125. For example, the ground position 140 may include an estimated area (e.g., circular, rectangular, or triangular area having some dimensional boundaries such as about two feet by two feet). In these or other embodiments, the ground position 140 may include the estimated area at which the player jumps/stands from during or prior to the time when the object 130 is positioned at the starting point 135. Additionally or alternatively, the ground position 140 may include an estimated point (e.g., a dot, an "X", or other symbol) that indicates a coordinate on the ground. For example, the ground position 140 may include an estimated coordinate or pin-point location on the ground that corresponds to a point on the player that is projected onto the ground at about the time the object 130 is positioned at the starting point 135. Examples of points on the player that may be projected onto the ground as the ground position 140 may include a center of mass, a center of gravity, an elbow, a heel, a waistline, etc. of the player.

Modifications, additions, or omissions may be made to the environment 100 without departing from the scope of the present disclosure. For example, in some embodiments, the environment 100 may include any number of other components that may not be explicitly illustrated or described.

Moreover, the separation of various components in the embodiments described herein is not meant to indicate that the separation occurs in all embodiments. In addition, it may be understood with the benefit of this disclosure that the described components may be integrated together in a single component or separated into multiple components.

FIG. 2A illustrates an environment 200 of an example embodiment in which a ground position is estimated. The environment 200 is arranged according to one or more embodiments of the present disclosure. As illustrated, the environment 200 may include a target region 202, images 204-216, a camera 220, a field of view 222, a trajectory 225, an object 230, a starting point 235, and a ground position 240. In some embodiments, the camera 220, the field of view 222, the trajectory 225, the object 230, the starting point 235, and the ground position 240 may be the same as or similar to the camera 120, the field of view 122, the trajectory 125, the object 130, the starting point 135, and the ground position 140, respectively, of FIG. 1.

According to FIG. 2A, the trajectory 225 of the object 230 may be determined (e.g., at the data manager 105 of FIG. 1) to estimate the ground position 240. The trajectory 225 may be determined using data generated by the camera 220. For example, the camera 220 may generate images of the object 230 in the field of view 222 of the environment 200. In these or other embodiments, identifying the object 230 in the target region 202 may trigger the determining of the trajectory 225 of the object 230. For example, data generated by the camera 220 may identify that the object 230 is within the target region 202. Based on the identification, e.g., performed by the data manager 105 of FIG. 1, that the object 230 is within the target region 202, the generated images of the object 230 may begin to be analyzed to determine the trajectory 225 as described further below.

In some embodiments, the target region 202 may include an area of interest defined by parameters. Additionally or alternatively, the target region 202 may be associated with a first position ($U_2$, $V_2$) in a U-V coordinate system that represents a two-dimensional coordinate system within images generated by the camera 220 (e.g., a coordinate system relative to the camera 220). Examples of target regions 202 may include a basketball backboard, a soccer goal, a football end zone, a particular section of a court, table or field, an archery target, a target for bullets, and the like. In some embodiments, the parameters defining the target region 202 may include preset parameters that correspond to one or more features and/or boundaries of the target region 202, such as corners, lines, hashes, rims, nets, plates, bags, cones, chalk, goal posts, tape, dots, etc. Additionally or alternatively, the parameters defining the target region 202 may be obtained using a neural network such as the neural network 115 of FIG. 1. Finding the target region 202 using the neural network is described in additional detail in conjunction with FIG. 2B.

In some embodiments, the object 230 may be detected within the target region 202, for example, as having crossed into the target region 202 as in the image 204, using background subtraction methods. Background subtraction methods may include any set of techniques that detect changes in data (e.g., scene changes due to changes in pixilation) in reference to a pre-processed image. Some example background subtraction techniques may include a temporal average filter algorithm, a frame differencing algorithm, a mean filter algorithm, a running Gaussian average algorithm, a background mixture algorithm, etc., and any combination thereof.

Additionally or alternatively, based on the identification, e.g., at the data manager 105 of FIG. 1, that the object 230 is within the target region 202, the generated images of the object 230 may begin to be further analyzed to determine the trajectory 225 of the object. For ease in explanation, a set of images 204, 206, 208, 210, 212, 214 and 216 have been transposed, where the object in each of these images is in a different position, while the rest of the features in the environment 200 appear to be static and unchanged. For example, the image 204 may include a first image in which a position of the object 230 is identified (e.g., within the U-V coordinate system). Images that are prior in time to the image 204 may be analyzed to also identify the object 230. For example, analysis of prior images to the image 204 may identify respective positions of the object 230 as indicated in images 206, 208, 210, 212, 214, and 216. In these or other embodiments, more or fewer images than those illustrated may be analyzed to determine the trajectory 225, e.g., three images, five images, seven images, fifteen images, about fifty images, or any other number of images.

In some embodiments, analysis of images, including any of the images 204, 206, 208, 210, 212, 214, and 216 may include analyzing the images to identify pixels that represent at least a portion of the object 230. For example, using background subtraction methods described above, pixels representing at least a portion of the object 230 may be searched for and/or identified (e.g., by the data manager 105 of FIG. 1). Additionally or alternatively, pixels representing at least a portion of the object 230 may be searched for and/or identified using a K-nearest neighborhood algorithm. In these or other embodiments, the neural network such as the neural network 115 of FIG. 1 may be implemented in identifying pixels representing at least a portion of the object 230.

In some embodiments, the identified pixels representing at least a portion of the object 230 may represent a particular aspect or feature of the object 230. For example, the identified pixels may represent a center of gravity, a mid-point, a center line, a stitching, a seam, an air inlet, a letter, etc. of the object 230. In these or other embodiments, the identified pixels representative of a particular aspect or feature of the object 230 may, in turn, be used to identify a position of the object 230 in a respective image. For example, a pixel or group of pixels may correspond to a center of gravity of the object 230. The position (e.g., in the U-V coordinate system) of the center of gravity of the object 230 may be designated as the position of the object 230 as a whole. In this manner, a position of the object 230 in one or more images generated by the camera 220 may be identified.

In some embodiments, analysis of images generated by the camera 220 may proceed from the image 204 in an apparent backwards manner (e.g., until reaching the image 216 or an image between the image 204 and the image 216). In these or other embodiments, the image 216 may include a stop image in which a center portion of pixels associated with the object 230 is unidentifiable. As referred to in the present disclosure, the term "unidentifiable" may describe a threshold in which ascertaining differences between pixels associated with the object 230 and pixels associated with an occlusion (such as a body, a head, or hands of a player, another object, an inanimate object, etc.) are considered indistinguishable according to, for instance, the data manager 105 of FIG. 1. For example, the pixels associated with the object 230 and the pixels associated with the occlusion may be of similar color, of similar outline or shape, etc. Additionally or alternatively, the term "unidentifiable" may describe a threshold absence of pixels associated with the object 230. For example, the pixels associated with the occlusion may be positioned between the camera 220 and the object 230 such that an amount of pixels associated with the object 230 may be undetected in the field of view 222. In some embodiments, if the amount of pixels associated with the object 230 detected is less than a threshold amount, or if the pixels define less than a threshold portion of the object 230 (e.g., less than about 50%, about 25%, about 10%, etc. of the whole of the object 230), then the pixels associated with the object 230 may be deemed unidentifiable.

In some embodiments in which analysis of images generated by the camera 220 may proceed from the image 204 in a backwards manner, the analysis may proceed image by image. Alternatively, the analysis of images may proceed backwards from the image 204 not image by image, but may proceed backwards by every other image, every five images, or any other increment, including a non-periodic increment. Additionally or alternatively, the analysis of images may proceed backwards from the image 204 according to a certain time interval on the order of microseconds, milliseconds, seconds, etc. In these or other embodiments, a position of the object 230 may thereby be identified at various positions between the image 204 and the image 216.

In some embodiments, the manner in which images generated by the camera 220 are analyzed may help to improve an efficiency, computational speed, etc. in determining the trajectory 225. For example, by skipping images or by analyzing a subset of images generated by the camera 220, a number of images analyzed to determine the respective position of the object 230 may be reduced, which in turn may lead to reduced processing resources. Additionally or alternatively, the number of images analyzed to determine the respective position of the object 230 may be based on a minimum amount of images that can be used to generate a curve fit for estimating the trajectory 225. For example, a minimum amount of images (e.g., a minimum amount of positions of the object 230) for generating the curve fit may be about three images, about five images, etc. In these or other embodiments, more analyzed images may result in increased accuracy of the curve fit and inversely may lead to increased computation and/or processing time. Additionally or alternatively, any images between the image 204 and the image 216 that have an occlusion, blurred pixels, non-determinative data, or are damaged may be skipped. In some embodiments, more images may be used when the object 230 has a relatively faster speed and fewer images may be used when the object 230 has a relatively slower speed. In at least one embodiment, more images may be used when the object 230 is in an area in the environment where it may be more difficult to detect the object 230, or to detect pixels associated with the object 230 to increase the likelihood of accurately detecting the object 230. Further, more images may be used as the object nears an endpoint of the trajectory 225 so as to more precisely identify endpoints of the trajectory.

After (or in some embodiments before) the image 216 is determined to be the stop image due to some portion of pixels associated with the object 230 being unidentifiable, another image may be identified as a second image (e.g., a starting image of the trajectory 225 in which the object 230 is identifiable). The second image may be positioned chronologically between the image 204 and the image 216. Additionally or alternatively, the second image may correspond to a position of the object 230 at the starting point 235 at $(U_1, V_1)$ in the U-V coordinate system.

In some embodiments, the positions of the object 230 identified in the images 204, 206, 208, 210, 212, 214, and 216 generated by the camera 220 may be fitted to a curve to estimate the trajectory 225. For example, a first position and a second position of the object 230 may be fitted to a curve. Additionally or alternatively, a third position, a fourth position, a fifth position, etc. may be fitted to the curve. In these or other embodiments, more or fewer positions may be fitted to the curve. As referred to in the present disclosure, a "curve fit" may include aspects related to any process of constructing a curve, or mathematical function, which applies a fit model (e.g., a best fit model) to a series of data points.

Accordingly, the curve fit of the present disclosure may include a reconstruction or estimation of the trajectory 225.

In some embodiments, for example, the position of the object 230 in image 204 (e.g., a first position) may be used to create a curve. Additionally or alternatively, the curve may be fit to a second position of the object 230, in which the second image may be positioned chronologically between the image 204 and the image 216. For example, the second position that is used to fit the curve may be the starting point 235. In these or other embodiments, additional positions of the object 230 corresponding to respective images between the first image and the second image may be used to fit the curve. In this manner, the trajectory 225 of the object 230 may be based on at least the first position in the first image (e.g., the image 204) and the second position in the second image (e.g., the image corresponding to the starting point 235). Additionally, in some embodiments, the trajectory 225 of the object 230 may be based on one or more positions between the first position in the first image (e.g., the image 204) and the second position in the second image (e.g., the image corresponding to the starting point 235), including, for example, one or more positions that correspond to images 206-214.

Additionally or alternatively, using positions of the object 230 to create a curve may yield a curve equation, including curve coefficients in the curve equation. In some embodiments, the curve coefficients may be input into the neural network, e.g., the neural network 115 of FIG. 1. In these or other embodiments, the neural network may output (e.g., estimate) the ground position 240 based on inputs to the neural network that include the curve coefficients of the trajectory 225.

Thus, in some embodiments, the ground position 240 may be determined based on the trajectory 225 without additional constraints other than the target region 202 being positioned at $(U_2, V_2)$ and the starting point 235 being positioned at $(U_1, V_1)$ in the U-V coordinate system of the images generated by the camera 220. For example, the camera 220 may be positioned at some unknown location $(X_1, Y_1, Z_1)$ in three-dimensional space of the environment 200. In these or other embodiments, accuracy of the estimated ground position 240 may be within a threshold accuracy so long as the camera 220 is somewhere within a predetermined area. For example, the camera 220 may have been positioned in various positions within an eight cubic meter space while training the neural network (e.g., the neural network 115 of FIG. 1). According to the example, accuracy of the estimated ground position 240 may be within a threshold accuracy so long as the camera 220 is anywhere within the eight cubic meter space while generating images 204-216 of the object 230 used to determine the trajectory 225. If the camera 220 is positioned outside the eight cubic meter space while generating images 204-216 of the object 230 used to determine the trajectory 225, accuracy of the estimated ground position 240 may be outside or beyond a threshold accuracy. Other sizes of predetermined areas larger and smaller than an eight cubic meter space is contemplated, for example, about half a cubic meter, about two cubic meters, about four cubic meters, about six cubic meters, about ten cubic meters, about fifteen cubic meters, about thirty cubic meters, or any other size or shaped space.

Modifications, additions, or omissions may be made to the environment 200 without departing from the scope of the present disclosure. For example, in some embodiments, the environment 200 may include any number of other components that may not be explicitly illustrated or described.

FIG. 2B illustrates the environment 200 in another example embodiment in which a ground position is estimated. FIG. 2B is arranged according to one or more embodiments of the present disclosure. As illustrated, FIG. 2B includes the same or similar elements of FIG. 2A with the following differences: the target region 202 at position $(U_2', V_2')$, the camera 220 at position $(X_1', Y_1', Z_1')$, and/or definition points 245a-245e of the target region 202.

In some embodiments, the ground position 240 may be determined based on the trajectory 225 despite movement of one or both of the camera 220 and the target region 202. For example, in response to movement of the camera 220 to the position of $(X_1', Y_1', Z_1')$, the trajectory 225 may be estimated as described above in conjunction with FIG. 2A after identifying the group of definition points 245a-245e that correspond to features with the target region 202. In these or other embodiments, $(X_1', Y_1', Z_1')$ may be outside the predetermined area in which the camera 220 was used while training the neural network (e.g., the neural network 115 of FIG. 1). Additionally or alternatively, in response to movement of the target region 202 to $(U_2', V_2')$, the trajectory 225 may be estimated as described above in conjunction with FIG. 2A after identifying the group of definition points 245a-245e that correspond to features with the target region 202. In these or other embodiments, the position $(U_2', V_2')$ of the target region 202 may include a different position than was used to train the neural network. Alternatively, the target region 202 may not have moved, but due to movement of the camera 220 in the X-Y-Z coordinate system, the position of the target region 202 may have changed from $(U_2, V_2)$ to $(U_2', V_2')$ since the U-V coordinate system may be relative from the perspective of the camera 220.

In some embodiments, the movement of the camera 220 and/or the target region 202 may be detected (e.g., automatically). For example, using the background subtraction methods described above, differences between images used to train the neural network and images later generated by the camera 220 may indicate that movement of the camera 220 and/or the target region 202 has occurred. Additionally or alternatively, movement of the camera 220 and/or the target region 202 may be designated as having occurred. For example, a user may input (e.g., to the data manager 105 of FIG. 1) a "new session," a "new gym," etc. from which movement of the camera 220 and/or the target region 202 can be automatically assumed to have occurred. In another example, a user may input (e.g., to the data manager 105 of FIG. 1) a "new position," a "new setup," "new gym," of one or both of the camera 220 and the target region 202.

In these or other embodiments in which movement of one or both of the camera 220 and the target region 202 occurs, estimation accuracy of the ground position 240 may be maintained by finding the position (e.g., $(U_2', V_2')$) of the target region 202. In some embodiments, finding the position of the target region 202 may include using a neural network such as the neural network 115 of FIG. 1 to identify the definition points 245a-245e.

In these or other embodiments, the definition points 245a-245e may represent geometrical points in the U-V coordinate system that correspond to a construct of the target region 202. Similar to the parameters defining the target region 202 discussed above, the definition points 245a-245e may correspond to one or more features and/or boundaries of the target region 202, such as corners, lines, hashes, rims, nets, plates, bags, cones, chalk, goal posts, tape, dots, etc. In these or other embodiments, the neural network, e.g., the neural network 115 of FIG. 1, may learn by training to associate an element or a combination of elements depicted in a two-dimensional image generated by the camera 220 as one or more features and/or boundaries of the target region 202.

In one example of image recognition training of a neural network, the neural network may be fed input data (e.g., images), and output of the neural network (e.g., guesses) may be compared to expected results such as predetermined or human designated labels. With additional cycles through the input data, weights in the neural network may be modified to decrease the error rate of the guesses. For example, weights in the neural network may be adjusted so that the guesses better match the as predetermined or human designated labels of the images.

In these or other embodiments, the input data fed to the neural network for training purposes may include images of the target region 202. Hundreds, thousands, or millions of images of the target region 202 may be provided to the neural network. Additionally or alternatively, the images of the target region 202 provided to the neural network may include labels that correspond to one or more features and/or boundaries of the target region 202 such as corners, lines, hashes, rims, nets, plates, bags, cones, chalk, goal posts, tape, dots, etc. For example, in the input data, the following labels may apply: the definition point 245a of the target region 202 may be labeled "Top Left Backboard Corner"; the definition point 245b may be labeled "Top Right Backboard Corner"; the definition point 245c may be labeled "Top Left Rectangle Corner"; the definition point 245d may be labeled "Top Right Rectangle Corner"; and the definition point 245e may be labeled "Center Rim." In this manner, guesses of the neural network can be compared to the labels, and additional learning cycles through the input data can allow for learned data and modification of weights to decrease error rates in identification of the target region 202, including identification of one or more features and/or boundaries of the target region 202.

After training the neural network (e.g., the neural network 115 of FIG. 1), the target region 202 may be found by the neural network in response to movement of one or both of the camera 220 and the target region 202. For example, the neural network may identify the definition points 245a-245e in images generated by the camera 220 post-training of the neural network. For instance, the neural network may identify the definition points 245a-245e in the images generated by the camera 220 post-training using the learned data and modified weights of the training process. In these or other embodiments, additional or alternative image recognition techniques may be used with the neural network to identify the definition points 245a-245e. Examples may include using: greyscale; RGB (red, green, and blue) values ranging from zero to 255; pre-processing techniques (e.g., image cropping/flipping/angle manipulation, adjustment of image hue, contrast and saturation, etc.); testing subsets or small batch sizes of data as opposed to entire datasets; and max-pooling to reduce the dimensions of an image by taking the maximum pixel value of a grid. In these or other embodiments, after the definition points 245a-245e are identified, the definition points 245a-245e may each be associated with a U-V coordinate. Additionally or alternatively, after the definition points 245a-245e are identified, the target region 202 as a whole may be associated with a new position of ($U_2'$, $V_2'$).

Modifications, additions, or omissions may be made to the environment 200 without departing from the scope of the present disclosure. For example, in some embodiments, the environment 200 may include any number of other components that may not be explicitly illustrated or described.

Figure 2C:
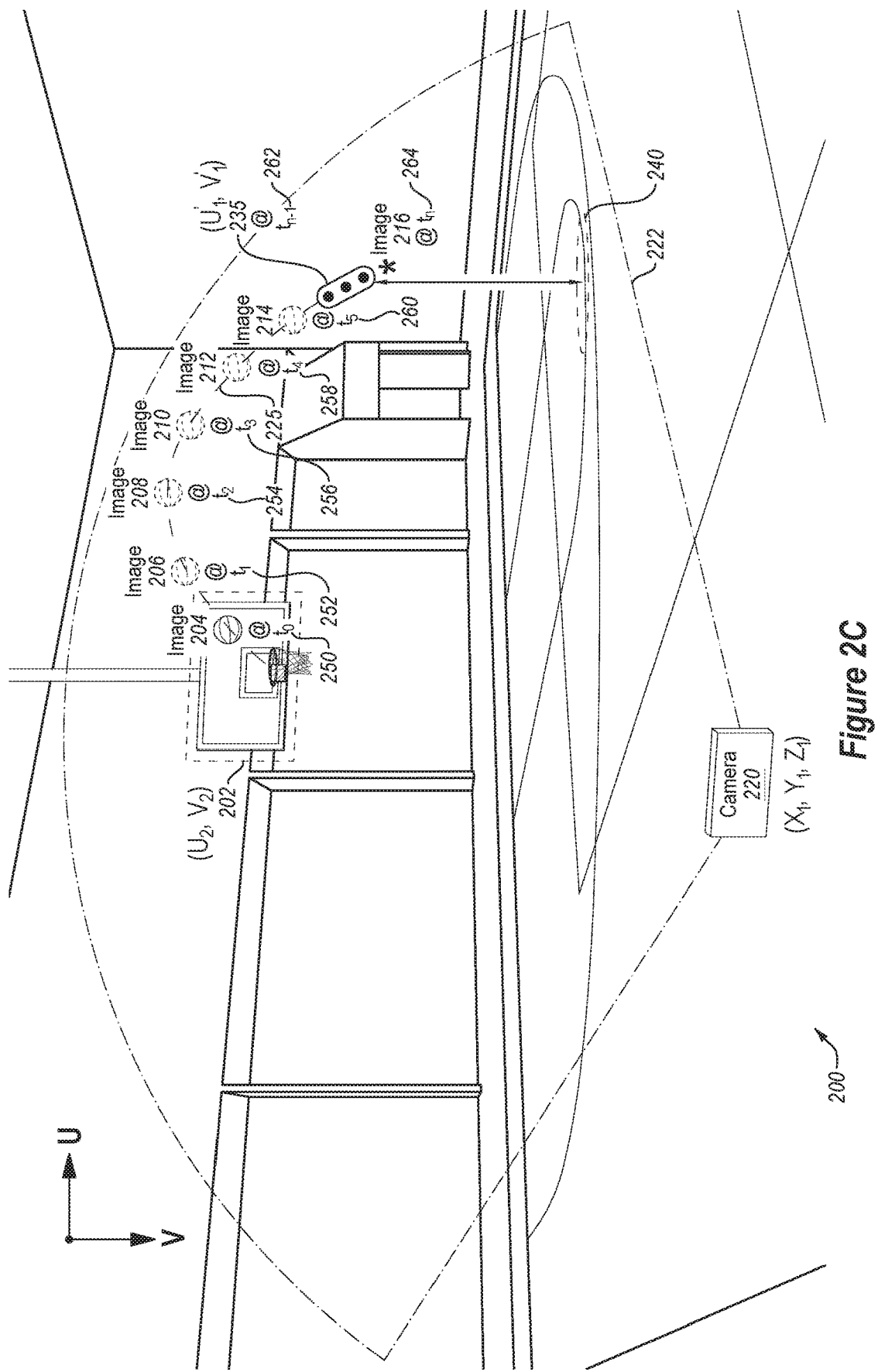
FIG. 2C illustrates yet another example embodiment in which the ground position of FIG. 1 is estimated.

FIG. 2C illustrates the environment 200 in yet another example embodiment in which a ground position is estimated. FIG. 2C is arranged according to one or more embodiments of the present disclosure. As illustrated, FIG. 2C includes the same or similar elements of FIG. 2A with the following differences: the starting point 235 at position ($U_1'$, $V_1'$), and/or image times 250-264 corresponding to images 204-216, respectively.

In some embodiments, the ground position 240 may be determined based on the trajectory 225 despite movement (e.g., variation) of the starting point 235 to an unknown or different position ($U_1'$, $V_1'$). In these or other embodiments, variation in the starting point 235 may be a result of a different player (e.g. a shorter or taller player) than the player used in training the neural network, a new shot that was not observed during the training of the neural network, increased or lowered jump height of the player than was observed during the training of the neural network, etc.

In some embodiments, the movement of the starting point 235 may be detected. For example, using the background subtraction methods described above, differences between images used to train the neural network and images later generated by the camera 220 may indicate that movement of the starting point 235 has occurred. For instance, in one example, the neural network may detect that the starting point 235 of a new player is outside a range of observed starting points 235 for a different player used to train the neural network. Additionally or alternatively, movement of the starting point 235 may be designated as having occurred. For example, a user may input (e.g., to the data manager 105 of FIG. 1) a "new session," a "new player," "new shot development," "new player height," "new jump height," etc. from which movement of the starting point 235 can be automatically assumed to have occurred.

In these or other embodiments, the variation of the starting point 235 may result in inaccuracies of the estimated ground position 240 if not compensated for. For example, variation in the starting point 235 that exceeds a threshold amount of variation may result in the estimated ground position 240 being inaccurate and/or outside a range of accuracy (e.g., outside or beyond a confidence interval of accuracy). Thus, in some embodiments, to compensate for the variation of the starting point 235, a flight time of the object 230 may be determined. By calculating the flight time of the object 230, the previously unknown position of the starting point 235 at ($U_1'$, $V_1'$) may be determined using kinematic equations of a projectile. For example, given the known position ($U_2$, $V_2$) or the determined position ($U_2'$, $V_2'$) of the target region 202, the flight time of the object 230, and/or various positions of the object 230 in-flight, the starting point 235 at ($U_1'$, $V_1'$) may be solved for using kinematic equations of a projectile to determine the trajectory 225 and subsequently the ground position 240.

In these or other embodiments, the flight time of the object 230 may be determined by counting a number of images between the first image and the second image discussed above. Given a predetermined imaging frequency at which the camera 220 generates images, the scalar product of the predetermined imaging frequency and the number of images (including the first image and those between the first image and the second image) may yield a flight time of the object 230. For example, the image 204 (e.g., the first image) may correspond with time $250=t_0$; the image 206 may correspond with time $252=t_1$; the image 208 may correspond with time $254=t_2$; the image 210 may correspond with time $256=t_3$; the image 212 may correspond with time $258=t_4$; the image 214 may correspond with time $260=t_5$; the image (e.g., the second image) associated with the starting point 235 may correspond with time $262=t_{n-1}$; and the image 216 (e.g., the stop image) may correspond with time $264=t_n$. Accordingly, the flight time of the object 230 may be approximately equal to time 262 minus time 250 (e.g., flight time~$t_{n-1}$-$t_0$). Additionally or alternatively, the flight time of the object 230 may be approximately equal to the predetermined imaging frequency multiplied by the number of images in the half-closed interval $(t_{n-1}, t_0]$.

Additionally or alternatively, increased precision of the estimated flight time of the object 230 may result using interpolation techniques and/or extrapolation techniques. For example, the image 204 may be the first image in which the object 230 is indicated to have crossed into the target region 202. However, the image 204 at time 250 may not correspond to the first moment when the object 230 crosses into the target region 202. Thus, in some embodiments, interpolation techniques may be used to more precisely define the time in between images (e.g., the image 204 and the image 206) at which the object 230 enters into the target region 202.

In these or other embodiments, the second image associated with the starting point 235 may be the last image in which a portion of the object 230 is identifiable as described above. However, the second image associated with the starting point 235 may not correspond to the first moment when the object 230 begins movement along the trajectory 225. Thus, in some embodiments, extrapolation techniques may be used to more precisely define the time beyond an image (e.g., the second image associated with the starting point 235) at which the object 230 begins movement along the trajectory 225. Additionally or alternatively, interpolation techniques may be used to more precisely define the time in between images (e.g., the second image associated with the starting point 235 and the stop image 216) at which the object 230 first begins movement along the trajectory 225. With the flight time of the object 230 determined, the starting point 235 at $(U_1', V_1')$ may be solved for using kinematic equations of a projectile to determine the trajectory 225 and subsequently the ground position 240 as described above in conjunction with the embodiments of the present disclosure.

Figure 3:
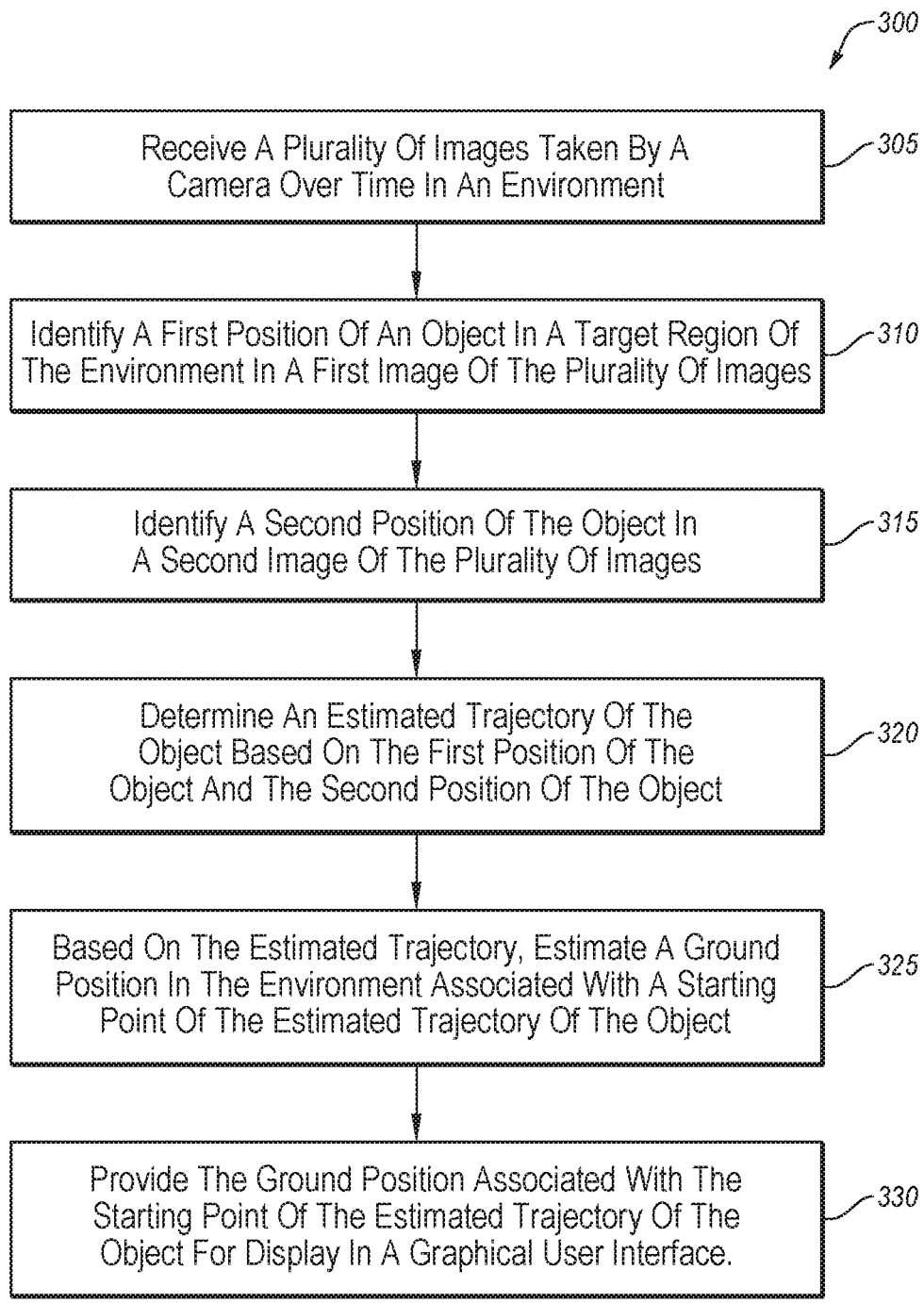
FIG. 3 illustrates an example method to estimate the ground position of any of FIGS. 1, 2A, 2B and 2C.

FIG. 3 illustrates an example method 300 to estimate the ground position of any of FIGS. 1, 2A, 2B, and 2C. The method 300 may be performed by processing logic that may include hardware (circuitry, dedicated logic, etc.), software (such as is run on a computer system), or a combination of both, which processing logic may be included in a client device, or another computer system or device. However, another system, or combination of systems, may be used to perform the method 300. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

The method 300 may begin at block 305, where a group of images taken by a camera over time in an environment may be received. At block 310, a first position of an object in a target region of the environment in a first image of the group of images may be identified. At block 315, a second position of the object in a second image of the group of images may be identified.

At block 320, an estimated trajectory of the object may be determined based on the first position of the object and the second position of the object. In some embodiments, the estimated trajectory of the object may be determined based on multiple positions of the object, e.g., three positions, five positions, seven positions, fifteen positions, about fifty positions, or any other number of positions. In these or other embodiments, the estimated trajectory of the object may be based on the first position of the object and the second position of the object without additional constraints other than the target region being positioned at a previously identified location in a U-V coordinate system and a starting point of the trajectory being positioned at another previously identified location in the U-V coordinate system. Additionally or alternatively, the estimated trajectory of the object may be determined despite movement of one or both of the camera and the target region. For example, in response to movement of one or both of the camera and the target region, the neural network may identify a group of definition points corresponding to features within the target region to find the target region and thereby determine the trajectory of the object. Additionally or alternatively, the estimated trajectory of the object may be determined despite movement and/or variation of the starting point of the trajectory. For example, in response to movement and/or variation of the starting point, a flight time of the object may be determined by counting a number of images between the first image and the second image.

At block 325, based on the estimated trajectory of block 320, a ground position in the environment associated with the starting point of the estimated trajectory of the object may be estimated. In these or other embodiments, the ground position may be estimated based on any combination of the foregoing embodiments of block 320. For example, estimating the ground position may include inputting, into a neural network, curve coefficients corresponding to the trajectory of the object and one or both of: the group of definition points corresponding to features within the target region and the flight time of the object. At block 330, the ground position associated with the starting point of the estimated trajectory of the object may be provided for display in a graphical user interface.

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

FIG. 4 illustrates an example system 400 that may be used to estimate a ground position. The system 400 may be arranged in accordance with at least one embodiment described in the present disclosure. The system 400 may include a processor 410, memory 412, a communication unit 416, a display 418, a user interface unit 420, and a peripheral device 422, which all may be communicatively coupled. In some embodiments, the system 400 may be part of any of the systems or devices described in this disclosure. For example, the system 400 may be part of the data manager 105 of FIG. 1. Additionally or alternatively, the system 400 may be part of the computing system 110 and/or the neural network 115.

Generally, the processor 410 may include any computer, computing entity, or processing device including various computer hardware or software modules and may be configured to execute instructions stored on any applicable computer-readable storage media. For example, the processor 410 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 4, it is understood that the processor 410 may include any number of processors distributed across any number of networks or physical locations that are configured to perform individually or collectively any number of operations described in this disclosure. In some embodiments, the processor 410 may interpret and/or execute program instructions and/or process data stored in the memory 412. In some embodiments, the processor 410 may execute the program instructions stored in the memory 412.

For example, in some embodiments, the processor 410 may execute program instructions stored in the memory 412 that are related to, for example, determining a ground position such that the system 400 may perform or direct the performance of the operations associated therewith as directed by the instructions. In these and other embodiments, instructions may be used to perform one or more operations of the method 300 of FIG. 3 described above.

The memory 412 may include computer-readable storage media or one or more computer-readable storage mediums for carrying or having computer-executable instructions or data structures stored thereon. Such computer-readable storage media may be any available media that may be accessed by a computer, such as the processor 410. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a computer. Combinations of the above may also be included within the scope of computer-readable storage media. Computer-executable instructions may include, for example, instructions and data configured to cause the processor 410 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

The communication unit 416 may include any component, device, system, or combination thereof that is configured to transmit or receive information over a network. In some embodiments, the communication unit 416 may communicate with other devices at other locations, the same location, or even other components within the same system. For example, the communication unit 416 may include a modem, a network card (wireless or wired), an infrared communication device, a wireless communication device (such as an antenna), and/or chipset (such as a Bluetooth device, an 802.6 device (e.g., Metropolitan Area Network (MAN)), a Wi-Fi device, a WiMax device, cellular communication facilities, etc.), and/or the like. The communication unit 416 may permit data to be exchanged with a network and/or any other devices or systems described in the present disclosure.

The display 418 may be configured as one or more displays, like an LCD, LED, or other type of display. The display 418 may be configured to output ground positions associated with a starting point of a trajectory of an object, a schematic or representation of an environment in which the ground position is located, user interfaces, and other data as directed by the processor 410.

The user interface unit 420 may include any device to allow a user to interface with the system 400. For example, the user interface unit 420 may include a mouse, a track pad, a keyboard, buttons, and/or a touchscreen, among other devices. The user interface unit 420 may receive input from a user and provide the input to the processor 410. In some embodiments, the user interface unit 420 and the display 418 may be combined.

The peripheral devices 422 may include one or more devices. For example, the peripheral devices may include a sensor, a microphone, and/or a speaker, among other peripheral devices. In these and other embodiments, the microphone may be configured to capture audio. The speaker may broadcast audio received by the system 400 or otherwise generated by the system 400. The sensor may be configured to sense changes in light, pixels, sound, motion, rotation, position, orientation, magnetization, acceleration, tilt, vibration, etc.

Modifications, additions, or omissions may be made to the system 400 without departing from the scope of the present disclosure. For example, in some embodiments, the system 400 may include any number of other components that may not be explicitly illustrated or described. Further, depending on certain implementations, the system 400 may not include one or more of the components illustrated and described.

As indicated above, the embodiments described herein may include the use of a computer (e.g., a processor element) including various computer hardware or software modules. Further, as indicated above, embodiments described herein may be implemented using computer-readable media (e.g., a memory element) for carrying or having computer-executable instructions or data structures stored thereon.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
   receiving a plurality of images taken by a camera over time in an environment;
   identifying a first position of an object in a target region of the environment in a first image of the plurality of images;
   identifying a second position of the object in a second image of the plurality of images;
   determining an estimated trajectory of the object based on the first position of the object and the second position of the object;
   based on the estimated trajectory, estimating a ground position in the environment associated with a starting point of the estimated trajectory of the object; and
   providing the ground position associated with the starting point of the estimated trajectory of the object for display in a graphical user interface.

2. The method of claim 1, wherein identifying the object in the target region triggers the determining of the estimated trajectory of the object.

3. The method of claim 1, wherein identifying the first position of the object in the first image and identifying the second position of the object in the second image include identifying pixels that represent at least a portion of the object.

4. The method of claim 3, wherein:
   identifying pixels that represent at least a portion of the object includes identifying pixels using a K-nearest neighborhood algorithm; and
   a center portion of the identified pixels represents a center of gravity of the object.

5. The method of claim 3, wherein:
   identifying positions of the object is performed in a backwards manner from the first image until reaching a stop image in which a center portion of pixels associated with the object is unidentifiable; and
   the second image is positioned chronologically between the first image and the stop image.

6. The method of claim 1, further comprising finding the target region of the environment using a neural network to identify a plurality of definition points corresponding to features within the target region.

7. The method of claim 6, wherein finding the target region of the environment is in response to movement of one or both of the camera and the target region.

8. The method of claim 1, wherein the second position of the object corresponds to the starting point of the estimated trajectory of the object, and the method further comprises:
   determining a flight time of the object in response to variation in the starting point of the estimated trajectory that exceeds a threshold amount of variation, the flight time determined by counting a number of images between the first image and the second image.

9. The method of claim 1, wherein determining the estimated trajectory includes fitting the first position and the second position to a curve to identify curve coefficients.

10. The method of claim 9, wherein estimating the ground position includes inputting into a neural network the curve coefficients and one or both of: a plurality of definition points corresponding to features within the target region and a flight time of the object.

11. A system comprising:
a memory; and
one or more processors communicatively coupled to the memory, the one or more processors being configured to execute instructions stored in the memory to cause the system to perform operations comprising:
receive a plurality of images taken by a camera over time in an environment;
identify a first position of an object in a target region of the environment in a first image of the plurality of images;
identify a second position of the object in a second image of the plurality of images;
determine an estimated trajectory of the object based on the first position of the object and the second position of the object;
based on the estimated trajectory, estimate a ground position in the environment associated with a starting point of the estimated trajectory of the object; and
provide the ground position associated with the starting point of the estimated trajectory of the object for display in a graphical user interface.

12. The system of claim 11, wherein identifying the object in the target region triggers the determining of the estimated trajectory of the object.

13. The system of claim 11, wherein identifying the first position of the object in the first image and identifying the second position of the object in the second image include identifying pixels that represent at least a portion of the object.

14. The system of claim 13, wherein:
identifying pixels that represent at least a portion of the object includes identifying pixels using a K-nearest neighborhood algorithm; and
a center portion of the identified pixels represents a center of gravity of the object.

15. The system of claim 13, wherein:
identifying positions of the object is performed in a backwards manner from the first image until reaching a stop image in which a center portion of pixels associated with the object is unidentifiable; and
the second image is positioned chronologically between the first image and the stop image.

16. The system of claim 11, wherein execution of the instructions further causes the system to find the target region of the environment using a neural network to identify a plurality of definition points corresponding to features within the target region.

17. The system of claim 16, wherein finding the target region of the environment is in response to movement of one or both of the camera and the target region.

18. The system of claim 11, wherein:
the second position of the object corresponds to the starting point of the estimated trajectory of the object; and
execution of the instructions further causes the system to determine a flight time of the object in response to variation in the starting point of the estimated trajectory that exceeds a threshold amount of variation, the flight time determined by counting a number of images between the first image and the second image.

19. The system of claim 11, wherein determining the estimated trajectory includes fitting the first position and the second position to a curve to identify curve coefficients.

20. A system, comprising:
one or more processors; and
non-transitory computer readable media that include instructions thereon that, in response to execution by the one or more processors, control performance of operations comprising:
receive a plurality of images taken by a camera over time in an environment;
identify a first position of an object in a target region of the environment in a first image of the plurality of images;
identify a second position of the object in a second image of the plurality of images;
determine an estimated trajectory of the object based on the first position of the object and the second position of the object;
based on the estimated trajectory, estimate a ground position in the environment associated with a starting point of the estimated trajectory of the object; and
provide the ground position associated with the starting point of the estimated trajectory of the object for display in a graphical user interface.

* * * * *